June 5, 1951  R. A. BRUFLAT  2,555,954
GRAVITY ACTUATED GUIDE FOR FARM MACHINES
Filed May 20, 1949
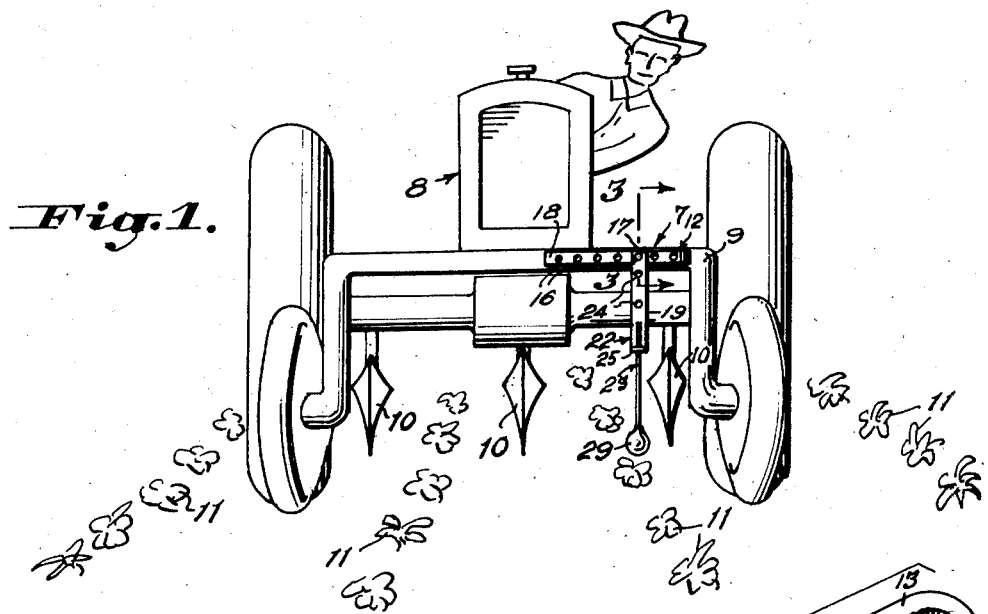
Inventor
Ragnar A. Bruflat
By John N. Randolph
Attorney Patented June 5, 1951

2,555,954

UNITED STATES PATENT OFFICE 2,555,954

GRAVITY ACTUATED GUIDE FOR FARM MACHINES

Ragnar A. Bruflat, Barneveld, Iowa

Application May 20, 1949, Serial No. 94,291

1 Claim. (Cl. 33—46)

This invention relates to a gravity actuated guide attachment adapted to be demountably supported on a farm machine for transverse swinging movement relatively thereto and which is maintained by gravity in substantially an upright position to provide a visual guide for the farm machine operator to enable the farm machine to be accurately guided while traversing the side of a hill or sloping surface so that earth engaging elements carried thereby will be correctly positioned relatively to plant rows being cultivated.

More particularly, it is an aim of the present invention to provide a pendulum-type guide which is capable of swinging laterally on a farm machine or tractor on which it is mounted and which may yield longitudinally of said machine to enable the guide to pass over rocks or other obstructions engaged thereby and which might otherwise damage the device.

Still another object of the invention is to provide a pendulum-type guide having means for laterally adjusting it transversely of a farm machine and which is formed of extensible and retractible sections for positioning the lower end of the guide at any desired level.

Still another object of the invention is to provide a pendulum-type guide formed of extensible sections including a substantially rigid upper section and a relatively resilient and extensible lower section the resiliency of which is increased as said lower section is extended and moved into closer proximity to the ground and where a greater likelihood exists of it striking obstructions.

Still a further object of the invention is to provide a gravity actuated pilot device having adjustable resilient friction means for yieldably resisting the swinging movement thereof to prevent the guide from swinging too freely and to cause it to maintain itself correctly positioned with respect to a plant row or other guiding line.

Various other objects and advantages of the invention will hereinafter become more fully apparent from the following description of the drawing illustrating a presently preferred embodiment thereof, and wherein:

Figure 1 is a front elevational view of a farm machine showing the gravity actuated attachment applied to the front end thereof;

Figure 2 is a fragmentary front elevational view of a portion of the farm machine shown traversing a sloping surface and illustrating the gravity actuated element in an upright position;

Figure 3 is an enlarged cross sectional view taken substantially along a plane as indicated by the line 3—3 of Figure 1;

Figure 4 is an enlarged fragmentary exploded perspective view of the various parts constituting the attachment, and Figure 5 is a fragmentary side elevational view of the upper end of the lower section of the pendulum element.

Referring more specifically to the drawing, for the purpose of illustrating one preferred application and use of the gravity actuated guide member, designated generally 7 and comprising the invention, a portion of a farm machine such as a tractor is illustrated at 8 and includes an arch-shaped front axle or frame portion 9 on the upper part of which the gravity actuated attachment 7 is mounted. The farm machine or tractor 8 is also shown equipped with a plurality of laterally spaced cultivator shovels 10 located at the rear end thereof in laterally spaced relationship for cultivating the earth between adjacent parallel crop rows, indicated at 11.

The gravity actuated guiding attachment 7 includes a supporting bracket or bar 12 having a turned back apertured end 13 which is adapted to be secured by a fastening 14, as seen in Figure 3, detachably to the upper portion of the axle or frame part 9 adjacent one end thereof and for positioning the other, elongated end 15 of the bracket 12 in outwardly or forwardly offset relationship to the axle 9. Said bracket portion 15 is provided with longitudinally spaced apertures 16 for selectively receiving a bolt and wing nut fastening 17 the bolt of which also extends through an aperture 18 formed in the upper portion of a bar 19 for detachably and adjustably supporting said bar 19 in a depending position relatively to the bracket 12. The bolt of the fastening 17 carries a pair of washers 20 and an expansion coil spring 21 which is interposed between said washers for yieldably retaining the wing nut of said fastening in frictional engagement with the bar 19 for restricting the lateral pendulum-like swinging movement of the bar 19 relatively to the bracket 12 and in a vertical plane transversely of the longitudinal axis of the farm machine 8.

The bar 19 constitutes the upper section of a gravity actuated guide member, designated generally 22, which also includes a lower extensible section, designated generally 23. Said upper section or bar 19 is provided with a series of longitudinally spaced openings 24 and has a right angularly disposed forwardly projecting lower end 25 which is provided with an opening 26.

The lower section 23 includes an elongated relatively resilient metal rod 27 which extends reciprocally through the opening 26 and which is provided with a laterally offset upwardly and outwardly curved upper end 28. A weighted element 29 is suitably secured to or formed integral with the lower end of the rod 27.

From the foregoing it will be readily apparent that the resiliency of the rod 27 will permit it to be flexed so that its offset end 28 can be inserted through any one of the openings 24 or disengaged therefrom for adjustably extending or retracting the lower section 23 relatively to the upper bar section 19 for positioning the weight 29 at any desired level above the ground. Likewise, it will be readily apparent that the gravity actuated guide unit 22 may be adjusted longitudinally of the bracket 12 and transversely of the farm machine 8 by the fastening 17 and the plurality of openings 16 for positioning said guide unit 22 in a predetermined position with respect to the cultivator shovel 10 or other earth engaging implement so that when the guide unit 22 is in alignment with a plant row 11 the shovel 10 will be correctly positioned between the plant rows or said guide unit 22 may be positioned to travel along the inner or outer side of a plant row 11 when the shovels 10 are properly disposed with respect to the plant rows, as illustrated in Figure 1. It will also be noted that the guide unit 22 is laterally offset with respect to the longitudinal center of the machine 8 so that the machine operator may conveniently watch the location of the guide unit 22 with respect to a particular plant row and guide the machine thereby without being required to look backward to ascertain the location of the cultivator elements 10 with respect to the plant rows 11.

However, the guide unit 22 is primarily intended to function where the machine edge is moving transversely across a slope as illustrated in Figure 2 and where it is particularly difficult to keep a farm machine properly located with respect to the plant row so that the cultivator elements will travel therebetween and the guide unit 22 is pivotally supported on the bracket 12 by the fastening 17 so that when the machine 8 is tilted laterally said guide unit 22 will still maintain an upright position to afford an accurate guide by following along a plant row so that when so disposed, as illustrated in Figure 2, the operator of the farm machine will be able to accurately determine the location of the cultivator elements with respect to the plant rows and without having to look to the rear. The spring 21 will apply pressure on the wing nut of the fastening 17 to prevent the guide unit 22 from swinging too freely and being responsive to vibrations of the farm machine and the fastening 17, may obviously be tightened or loosened to vary this spring pressure.

From the foregoing it will be readily apparent that the upper guide unit section 19 is substantially rigid whereas the lower section thereof below the portion 25 is relatively resilient and with the resiliency thereof varying and increasing as the lower guide unit section 23 is extended so that the closer the weight 29 is disposed to the ground, the greater will be the resiliency of the rod 27 below the portion 25 so that if the weight 29 strikes an obstruction the rod 27 may readily yield to permit the weight to ride thereover. The section 27 is retractible to position the weight at different levels depending upon the height of the plants of a plant row and obviously where the weight is disposed considerably above the ground, the danger of it striking obstructions is minimized.

Various modifications and changes are contemplated and may obviously be restorted to, without departing from the spirit or scope of the invention as hereinafter defined by the appended claim.

I claim as my invention:

A gravity actuated guiding attachment for farm machines comprising a supporting bracket adapted to be detachably mounted on the forward part of a farm machine and extending transversely thereof, a pendulum-type gravity actuated guide member pivotally mounted on the supporting bracket and depending therefrom and maintained by gravity in an upright position for movement along a crop row for indicating the transverse position of the farm machine with respect thereto, said guide member being formed of extensible sections including an upper bar section adjustably and detachably mounted on the supporting bracket and depending therefrom, said bar section having a right angularly disposed lower end provided with an aperture, the depending portion of said bar being provided with a series of longitudinally spaced openings, the other, lower section of said guide member comprising an elongated metal rod which extends reciprocally through the aperture of the lower end of said bar section, said rod being relatively resilient and having a laterally offset upper end for insertion into or detachment from the longitudinally spaced openings of the bar for detachably mounting said lower section in a plurality of extended positions, and a weighted element fixed to the lower end of said rod and adapted to travel along a plant row, the portion of said rod disposed below the bar being flexible to permit said portion to yield to allow the weighted element to ride over obstructions, and the yieldability of said lower rod portion increasing as the sections are extended and the weighted element is moved into closer proximity to the ground.

RAGNAR A. BRUFLAT.

REFERENCES CITED

The following references are of record in the file of this patent:

UNITED STATES PATENTS

| Number | Name | Date |
|---|---|---|
| 1,021,021 | Vibbert | Mar. 26, 1912 |
| 1,194,460 | Yocum | Aug. 15, 1916 |
| 1,237,260 | Bentson | Aug. 14, 1917 |
| 1,373,852 | Allen | Apr. 5, 1921 |
| 1,661,812 | Smith | Mar. 6, 1928 |
| 1,969,522 | Penote | Aug. 7, 1934 |
| 2,143,997 | Parkinson | Jan. 17, 1939 |
| 2,281,806 | Schulman | May 5, 1942 |
| 2,384,466 | Hickey | Sept. 11, 1945 |
| 2,414,285 | Bloomingburg | Jan. 14, 1947 |
| 2,483,011 | Hudson | Sept. 27, 1949 |
| 2,486,697 | White | Nov. 1, 1949 |
| 2,503,408 | Phillips | Apr. 11, 1950 |